(No Model.) 5 Sheets—Sheet 1.

R. H. LITTLE.
APPARATUS FOR DISPENSING ARTICLES OF MERCHANDISE.

No. 481,908. Patented Aug. 30, 1892.

Fig. 1.

Witnesses:
Fred Gerlach
J. B. Carpenter

Inventor:
Robert H. Little
By Price & Fisher
Attorneys.

(No Model.) 5 Sheets—Sheet 2.

R. H. LITTLE.
APPARATUS FOR DISPENSING ARTICLES OF MERCHANDISE.

No. 481,908. Patented Aug. 30, 1892.

Witnesses:
Fred Gerlach
J. B. Carpenter

Inventor:
Robert H. Little
By Pierce & Fisher
Attorneys.

(No Model.) 5 Sheets—Sheet 3.

R. H. LITTLE.
APPARATUS FOR DISPENSING ARTICLES OF MERCHANDISE.

No. 481,908. Patented Aug. 30, 1892.

Witnesses:
Fred Gerlach
J. B. Carpenter

Inventor
Robert H. Little
By Price & Fisher
Attorneys (No Model.) 5 Sheets—Sheet 4.

R. H. LITTLE.
APPARATUS FOR DISPENSING ARTICLES OF MERCHANDISE.

No. 481,908. Patented Aug. 30, 1892.

Witnesses:
Fred Gerlach
J. B. Carpenter Inventor:
Robert H. Little
By Peirce & Fisher
Attorneys.

(No Model.) 5 Sheets—Sheet 5.

R. H. LITTLE.
APPARATUS FOR DISPENSING ARTICLES OF MERCHANDISE.

No. 481,908. Patented Aug. 30, 1892.

Witnesses:
Fred Gerlach
J. B. Carpenter

Inventor:
Robert H. Little
By Price & Fisher
Attorneys.

UNITED STATES PATENT OFFICE.

ROBERT H. LITTLE, OF CHICAGO, ILLINOIS, ASSIGNOR TO JOHN G. SAXE, OF SAME PLACE.

APPARATUS FOR DISPENSING ARTICLES OF MERCHANDISE.

SPECIFICATION forming part of Letters Patent No. 481,908, dated August 30, 1892.

Application filed May 7, 1891. Serial No. 391,867. (No model.)

*To all whom it may concern:*

Be it known that I, ROBERT H. LITTLE, a resident of Chicago, Illinois, have invented certain new and useful Improvements in Apparatus for Dispensing Articles of Merchandise and for other Purposes, of which I do declare the following to be a full, clear, and exact description, reference being had to the accompanying drawings, forming part of this specification.

My present invention, while applicable to other purposes, has relation more particularly to that class of apparatus in which the sale of articles of merchandise is effected by the dropping of a coin or token of proper character into a slot or runway of the apparatus, the coin or token serving to render operative suitable means whereby the article of merchandise can be discharged from an appropriate receptacle into the hand of the purchaser. Devices of this kind, commonly called "coin-controlled devices" and "slot-machines," have heretofore been employed for the purpose of dispensing cigars or like articles; but in all prior machines of this character, so far as I am aware, the machine was designed to deliver but a single article of merchandise to the purchaser in exchange for his coin.

One of the objects of my invention, when it is to be employed for vending articles of merchandise, is to offer to the intending purchaser an inducement to invest, so that he shall be certain not only of obtaining the value of the coin deposited in the machine, but shall be given a bonus in the nature of a chance to obtain an additional article free of cost. In other words, while the purchaser shall in every instance obtain full value for his coin, he may also obtain an additional article without further cost. This object I have accomplished by the combination, with a coin-controlled apparatus, of a supplemental apparatus designed to be rendered operative by a rolling body, the delivery of which into such supplementary apparatus is a matter of chance.

While the primary object of my invention is as above stated, it will be manifest that the invention can be employed for other purposes and can be operated by other devices than by coins. For example, suitable checks or tokens may be used for the playing of games or the like.

A designates the body of the inclosing case, this body being preferably formed with a removable back or door A', controlled by a suitable lock $a$. In the front $A^2$ of the casing is formed an opening, through which extends the hub $b$ of the plate B, in which hub is journaled the section $c$ of the operating-shaft, to which is attached the operating-handle B', the extent of movement of this handle being determined by suitable stops $b'$ and $b^2$, projecting from the plate B. The inner end of the section $c$ of the shaft is adapted to be brought into engagement with the companion section $c'$ of the shaft by means of a clutch C. This clutch C may be of any suitable character in order to enable the sections of the shaft to be detachably joined together, as I prefer they should be, and for convenience I have shown the clutch as consisting of a plate $c^2$, having notches therein adapted to receive lugs $c^3$, projecting from a plate $c^4$ upon the end of the section $c'$ of the shaft. My purpose in thus providing the sections $c$ and $c'$ of the shaft with a clutch is to permit the coin-controlled mechanism to be readily placed into and removed from the casing and to be at the same time conveniently connected to and disengaged from the shaft of the operating-handle, the section $c'$ of the operating-shaft extending through the upright D and partially through the upright D', which uprights serve to sustain the mechanism by which the coin or other token is caused to throw the delivery mechanism into operation. The section $c^5$ of the operating-shaft extends through the stand $D^2$, that serves to support the articles of merchandise to be vended or delivered by the machine.

The uprights D and D' and the stand $D^2$ are bolted, preferably, to a base-plate $D^3$, so that the entire apparatus may be conveniently inserted into and removed from the inclosing casing when desired.

Upon the section $c'$ of the operating-shaft and between the uprights D and D' is keyed a coin-carrier E, having a channel $e$ therein adapted to receive the coin or token that is to render the machine operative. In the preferred embodiment of my invention the coin-carrier E is formed with a supplemental carrier or extension E', preferably connected to or formed in piece therewith, and this extension is formed with a seat $e'$, adapted to receive a spherical body, that will be delivered thereto by means to be presently described.

Figures 2, 3:
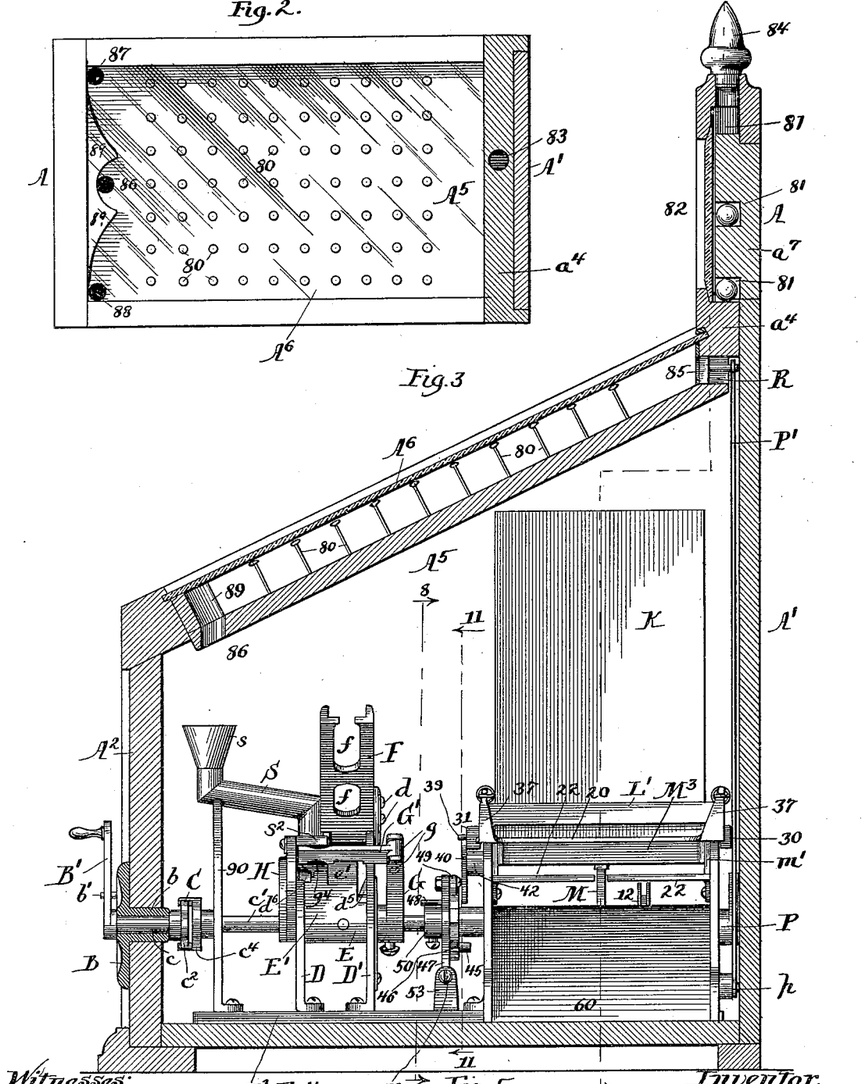
Fig. 2 is a plan view, the back portion of the casing being shown in section.
Fig. 3 is a view in vertical longitudinal section through the casing, the mechanism being shown in side elevation.
Figure 4:
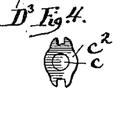
Figs. 4 and 5 are detail views of the clutch mechanism for connecting the parts of the operating-shaft.
Figure 5:
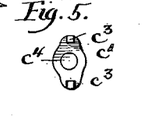
Figures 12, 15, 16, 17:
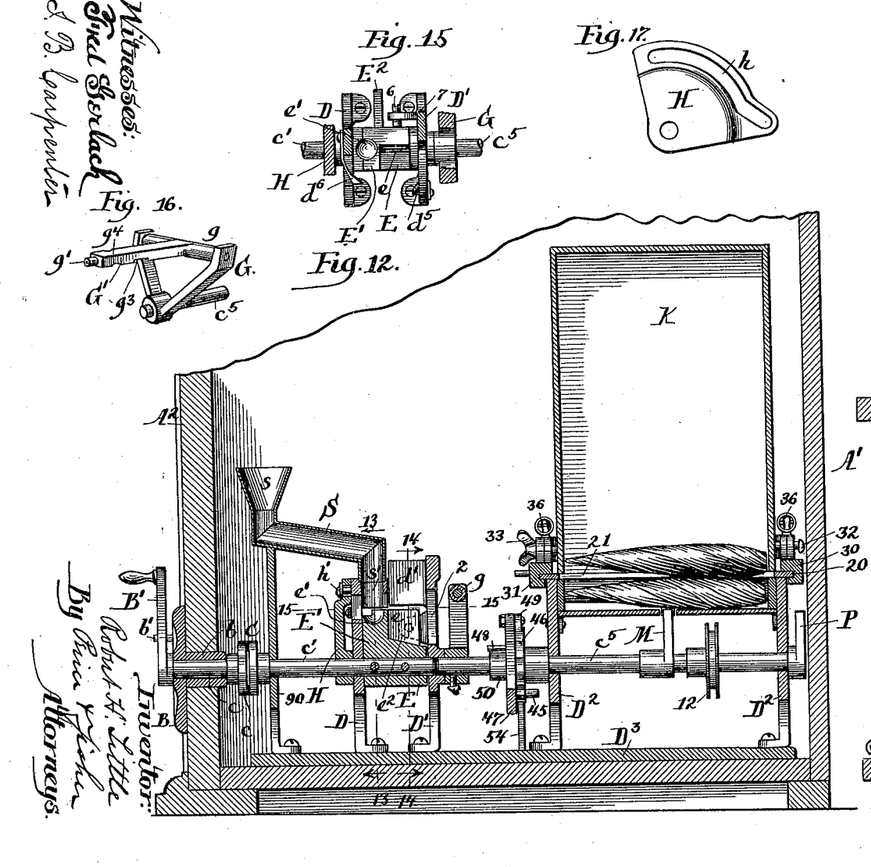
Fig. 12 is a view in central vertical longitudinal section, the upper portion of the apparatus being broken away.
Fig. 15 is a detail view, in horizontal section, on line 15 15 of Fig. 12.
Fig. 16 is a detail perspective view of the operating-bar and its frame upon the operating-shaft.
Fig. 17 is a detail view, in side elevation, of the slotted cam-plate on the operating-shaft.
Figures 13, 14:
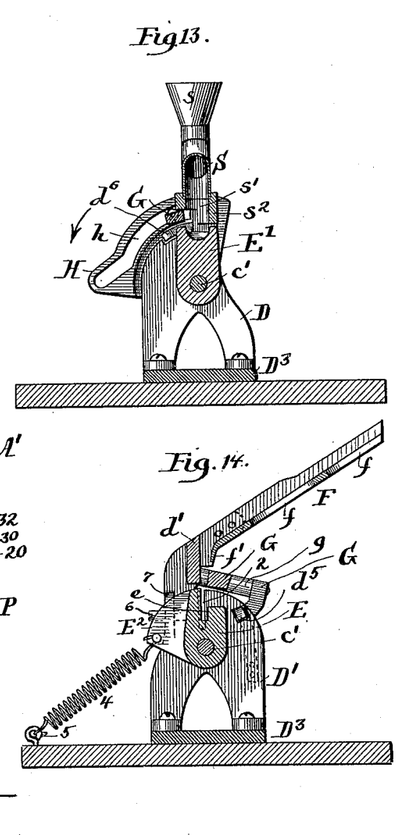
Fig. 13 is a view in vertical transverse section on line 13 13 of Fig. 12, the casing being omitted.
Fig. 14 is a view in vertical transverse section on line 14 14 of Fig. 12.

By reference more particularly to Figs. 3 and 14 of the drawings it will be seen that there is attached, as by screws $d$, to the upper part of the upright D' a coin-chute F, the opposite end of which extends in proximity to a slot $a'$, formed in the side of the inclosing casing and through which the coin or token will be dropped into the coin-chute F. The coin-chute F is preferably formed with the openings $f$ in its under side, so that if the coins or tokens introduced into the slot $a'$ be not of proper diameter they will drop through the openings $f$, and will therefore fail to operate the machine. The inner end of the chute F terminates near the angular extensions $d'$ of the upright D', and between this extension and the depending lip $f'$ of the chute F the coin or token will drop and will pass thence into the channel $e$ of the coin-carrier E. The bottom of the channel $e$ is inclined, as at $e^2$, Fig. 12, and if the coin be thinner than the standard size for which the machine is designed such coin will roll through the slot 2 in the upright D' and fall to the bottom of the machine without serving to render the mechanism operative; but if the coin is thicker than the space between the back of the coin-channel $e$ and the front edge of the slot 2 in the upright D' it will remain within the coin-channel $e$ and will serve to render the machine operative, as will presently more fully appear.

The coin-carrier E and supplemental carrier E' have connected thereto an arm $E^2$, to which is attached one end of a coiled spring 4, the opposite end of this spring being attached to an eye 5 in the base of the machine, and this spring 4 serves to hold the carriers E and E' normally against the end of an adjusting-screw 6, that passes through a screw-threaded lug 7, formed at the back of the upright D'. My purpose in providing this adjusting-screw 6 is to enable the position of the coin-carrier E to be accurately adjusted with respect to the slot 2 in the upright D', so as to properly determine the width of the opening through which under-sized coins or tokens may be allowed to escape.

Upon the section $c^5$ of the operating-shaft, which section normally abuts against but is not connected to the section $c'$ of the shaft, is keyed a frame G, (see Fig. 16,) between the arms of which is journaled a short shaft $g$, carrying the operating-bar G', the opposite end of this operating-bar G' being preferably furnished with a friction roll or stud $g'$, that travels within a cam-shaped slot $h$, formed in the plate H. (See Figs. 13 and 17.) This plate H is preferably formed with a hole, through which the section $c$ of the operating-shaft passes, and the upper end of the plate H is conveniently attached, as by a set-screw $h'$, to the upper end of the upright D. (See Fig. 12.) The operating-bar G' extends across and in front of the upper portions of the coin-channel $e$ of the coin-carrier E and the seat $e'$ in the supplemental carrier E', and when either a coin or token of proper size is in the seat $e'$ such coin or body will extend above the lower edge of the operating-bar G'. Hence it will be seen that if the sections $c$ and $c'$ of the operating-shaft are turned by the movement of the operating-handle B' at any time when either a proper coin or token is within the channel $e$ or a sphere or body of proper size is within the seat $e'$ such turning of the sections $c$ and $c'$ of the shaft will carry with them the carriers E and E', and inasmuch as the coin or token within the channel $e$ or the sphere or body within the seat $e'$ projects above the lower edge of the operating-bar G' such coin or sphere will engage with this operating-bar, and hence as the carriers E and E' are rotated by the turning of the shaft-section $c'$ the coin within the channel $e$ or body within the seat $e'$ will by reason of its engagement with the operating-bar G' cause a like rotation of the frame G, and consequently of the sections $c^5$ of the operating-shaft. This turning of the section $c^5$ of the operating-shaft will cause the delivery of the article of merchandise through the mechanism to be hereinafter described. It will be seen that as the coin-carrier or supplemental carrier, with the coin or sphere in its appropriate channel or seat is thus revolved, carrying with it the operating-bar G', the stud or roll g' at the end of this operating-bar will travel along the cam-shaped slot h of the fixed plate H until this stud or roll reaches the lower portion of the slot h, when the stud or roll will be deflected, causing the operating-arm G' to turn about its pivot-point and release the coin or sphere engaged therewith.
To more readily permit the discharge of the coin or sphere, I prefer to provide the under side of the operating-bar G' with the notches $g^3$ and $g^4$ opposite the channel e and seat e', so as to allow but a slight engagement of the coin with the operating-bar and insure the release of the coin upon a slight movement of this bar. So, also, to prevent the backward movement of the coin-carrier before the complete discharge of the coin is effected I have provided the uprights D and D' with spring pawls or checks $d^5$ and $d^6$, that project through openings in the uprights D and D' in the path of the coin and of the ball or sphere that may be within the channel e and seat e' of the carriers E and E'. When the coin-carrier E or the supplemental carrier E' has moved so far as to carry the coin or sphere beyond the spring pawls or checks $d^5$ and $k^6$, the backward movement of these carriers, with the coins therein, will be impossible, as the squared shoulders of the pawls or catches $d^5$ and $d^6$ will engage with the coin or sphere. The inclined faces of these pawls or catches $d^5$ and $d^6$ will readily permit the forward movement of the carriers with the coin or sphere therein. As soon as the operating-bar G' is thus thrown out of engagement with the coin or sphere, and hence disengaged from the coin-carrier E or supplemental carrier E', as the case may be, the coin will drop from the channel e or the sphere will drop from the seat e' to the base of the inclosing casing, and a coiled spring 10, attached to a cord or strap 11, passing around a grooved pulley 12 on the section $c^5$ of the operating-shaft, will cause the backward movement of the section $c^5$ of the shaft and will cause the return of the frame G and operating-bar G' to their normal positions.

Figures 8, 10, 11:
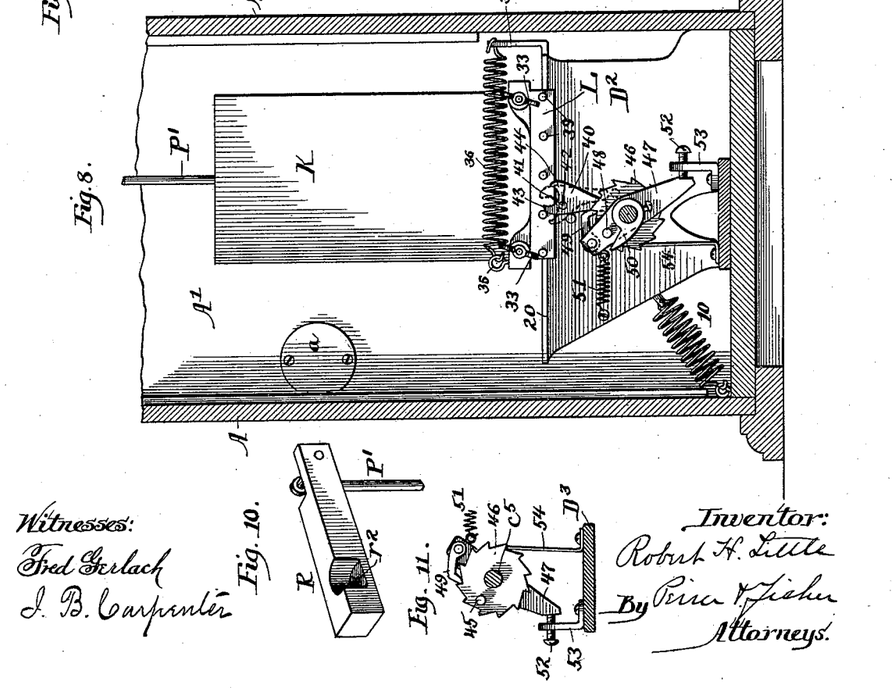
Fig. 8 is a view in vertical transverse section on line 8 8 of Fig. 3.
Fig. 10 is a detail perspective view of the slide-block whereby the release of the spherical bodies is effected.
Fig. 11 is a detail sectional view on line 11 11 of Fig. 3.
Figure 9:
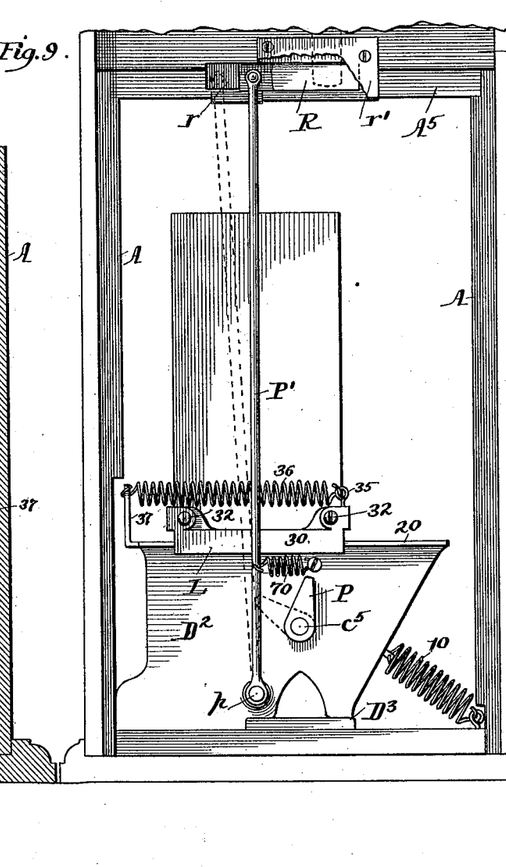
Fig. 9 is a view in rear elevation, the door at the back of the casing being removed and parts being broken away.

The mechanism whereby the articles of merchandise will be discharged from the inclosing casing will next be described. The articles to be dispensed—such, for example, as cigars—are contained within a box K, that is mounted upon the table 20 of the stand $D^2$.
The box K is provided with a series of compartments k, k', $k^2$, and $k^3$, these compartments being in any desired number, and within these compartments the articles to be dispensed will be arranged one upon the other, as shown more particularly in Fig. 6 of the drawings. Within the top or table 20 of the stand $D^2$ is formed an opening 21, corresponding in size to the bottom of the individual compartments k, &c., of the box K, so that when any one of these individual compartments is above the opening 21 the lowermost article will drop from such compartment onto a stationary false bottom 22, that extends between and is fixed to the sides of the stand $D^2$. The compartment-box K is held within a shifting frame L, the side bars L' of which are attached to grooved slide-bars 30 and 31, that straddle and slide upon the projecting edges of the top or table 20 of the stand $D^2$. The side bars L' are provided with suitable set-screws 32 and 33, whereby the box K can be tightly clamped within the shifting frame. To the shifting frame L is suitably connected, as by eyes 35, coiled springs 36, the opposite ends of these springs being connected to arms 37, that rise from the stand $D^2$, (see Figs. 8 and 9,) and these coiled springs 36 exert a constant tendency to feed forward the compartment-box from time to time as its individual compartments are emptied. The slide-bar 31 of the shifting frame L is provided with a series of pins 39, corresponding in number and arrangement with the compartments k, &c., of the box K, and with these pins 39 will engage an escapement-lever or dog 40, that is pivoted, as at 41, to a stud 42 upon one side of the stand $D^2$. (See Fig. 8.) The lower end of this escapement-lever or dog 40 extends into position to be struck by a releasing-pin 45, projecting from the side of a ratchet-wheel 46, that is loosely mounted upon the section $c^5$ of the operating-shaft, while the upper end of the escapement-lever or dog 40 is provided with the arms 43 and 44 to engage the pins 39 in a manner to be presently explained. A step-by-step motion in forward direction is imparted to the ratchet-wheel 46 by means of a driving-arm 47, that is loosely mounted upon the section $c^5$ of the operating-shaft, this driving-arm having movement imparted thereto in forward direction by a rocking arm 50, that is keyed to the section $c^5$ of the shaft and engages with a stud 48, projecting from the sides of the driving-arm 47. The upper end of the driving-arm 47 carries a feed-pawl 49, that engages the teeth of the ratchet-wheel 46 when the drive-arm 47 is moved in forward direction. The coiled spring 51, attached to the upper end of the driving-arm 47, serves to retract this arm after each forward movement, and a set-screw 52, that passes through a threaded hole in the standard 53, contacts with the lower end of the driving-arm 47 and determines the extent of its backward movement. The teeth of the ratchet-wheel 46 will correspond in number to the number of articles adapted to be carried by each of the compartments k, &c., of the box K, and at each movement of the section $c^5$ of the operating-shaft, by which the discharge of one of these articles is effected by mechanism to be presently described, the ratchet-wheel 46 will be advanced the distance of one tooth. A check-pawl 54 will guard this ratchet-wheel against backward movement. Hence it will be seen that when the ratchet-wheel 46 makes one complete revolution the releasing-pin 45, projecting from the side of this ratchet-wheel, will contact with the lower end of the escapement-lever or dog 40 and will rock such escapement-lever about its pivot-point 41 until the arm 43 of this lever passes out of engagement with the pin 39, at such time bearing against this arm, as shown by dotted lines in Fig. 3. When the arm 43 of the lever 40 is thus disengaged from the pin 39, the coiled spring 36 will draw forward the shifting frame L, carrying with it the box K, until the pin 39, that has just been released, contacts with the opposite arm 44 of the escapement-lever or dog 40, thereby swinging this lever until its arm 43 returns to its normal position to engage the next succeeding pin 39 of the series. In this way the compartment-box K will be advanced, so as to bring the succeeding compartments $k$, &c., above the opening 21 of the table 20.

Upon the section $c^5$ of the operating-shaft is keyed the segment rack-plate M, that engages with a rack-bar M', fastened to the under side of the discharge-plate $M^2$, this discharge-plate resting upon the top of the false bottom 22 and being limited as to its backward movement by a suitable stop $m$, projecting from the side of the stand $D^2$. (See Fig. 6.) The discharge-plate $M^2$ has connected thereto or formed in one piece therewith the forwardly-extending arms $m'$, between which extends a guard plate or bar $M^3$, the space $m^2$ between this guard plate or bar $M^3$ and the front edge of the discharge-plate $M^2$ corresponding in size with the opening 21 in the bottom of the table 20. Preferably the upper front edge of the discharge-plate $M^2$ is rounded or beveled, so that when this plate is operated to discharge a cigar or like article the superposed articles of the compartment will not be cut or broken by the plate. Between the legs of the stand $D^2$ is held a discharge-chute or apron 60, that leads from beneath the front edge of the false bottom 22 to a delivery-opening 61 in the side of the inclosing casing A.

Figures 6, 7:
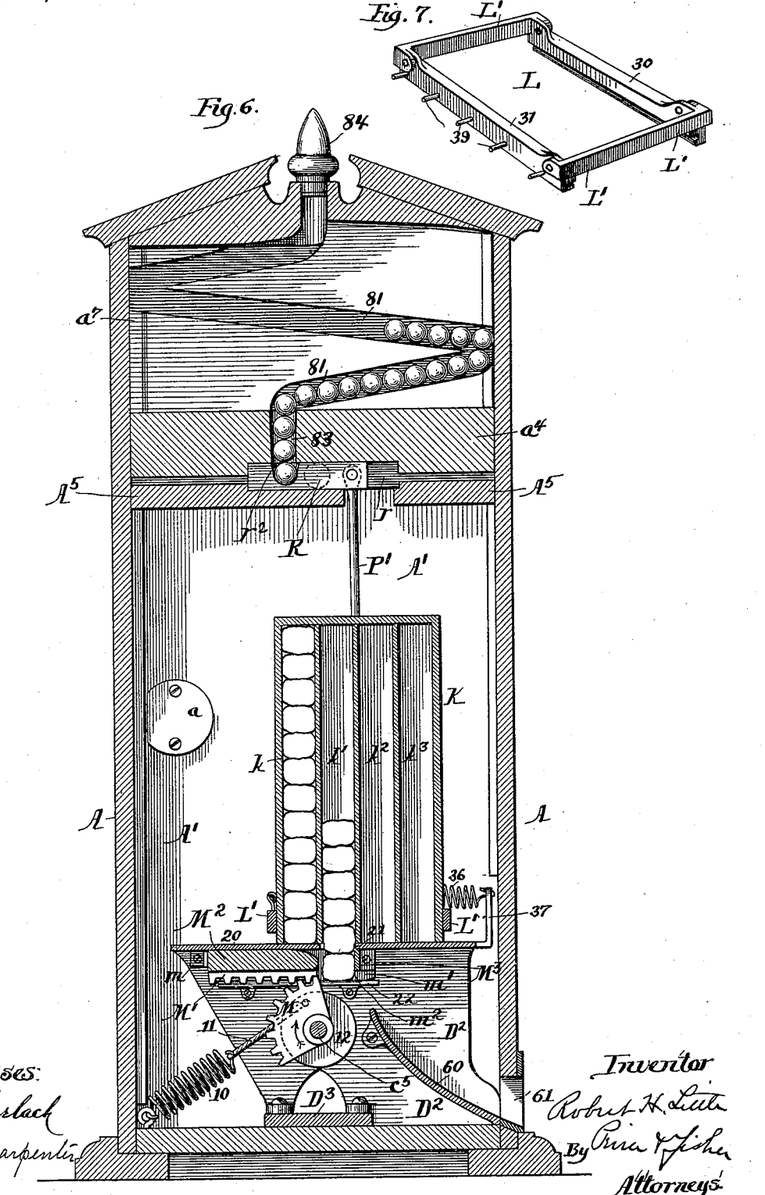
Fig. 6 is a view in vertical transverse section on line 6 6 of Fig. 3.
Fig. 7 is a detail perspective view of the shifting frame for the box containing the articles to be delivered.

From the foregoing description it will be seen that when the section $c^5$ of the shaft is operated in a manner hereinbefore defined the segment rack-bar M will be turned in the direction of the arrow, Fig. 6, and by reason of its engagement with the rack-bar M' will force forward the discharge-plate $M^2$, causing this plate and the guard-bar $M^3$ to move over the face of the false bottom 22 and carry with it the lowermost cigar or article which at such time is resting upon the top or the false bottom 22 until the discharge-plate $M^2$ carries such article beyond the front edge of the false bottom 22, when it will drop upon the inclined chute or apron 60, and will pass thence through the delivery-opening 61 in the side of the inclosing casing. When the coin has been released from the coin-carrier E in manner before defined and the section $c^5$ of the operating-shaft has been drawn backward by the coiled spring 10, the segment rack-bar M will be reversely moved in like manner and will restore the discharge-plate $M^2$ to its normal position. As soon as the space or opening $m^2$ at the front of the discharge-plate $M^2$ comes coincident with the opening 21 in the table 20 another cigar or like article will drop into the space $m^2$ in readiness to be moved forward at the next operation of the discharge-plate $M^2$.

To the rear end of the section $c^5$ of the operating-shaft is keyed a rocking arm P, the free end of which is adapted to contact with the shifting rod P', (see Fig. 9,) the lower end of which is pivoted, as at $p$, to the stand $D^2$, and the upper end of which rod has connected thereto a slide-block R, that moves within a suitable space or way $r$ in the upper part of the inclosing casing. A coiled spring 70, attached to the rod P' and connected to the stand $D^2$, serves to normally retract the rod P to the position shown in Fig. 9. The woodwork in the upper part of the inclosing casing A is cut away to form the channel or way $r$ for the slide-block R, and by preference a retaining-plate $r'$ also serves to hold this slide-block against danger of displacement.

The top of the inclosing casing consists of a top plate $A^5$, at a slight distance above which is placed a glass plate $A^6$, the plates $A^5$ and $A^6$ being both suitably connected to the side frames of the inclosing casing A. In the upper face of the top plate $A^5$ is set a large number of pins 80 at convenient distances apart, and over the face of this inclined top plate $A^5$ will roll the balls or spheres by which the operative mechanism of the apparatus may under certain contingencies be thrown a second time into action, as will presently more fully appear.

The inclosing casing A is provided with extended back $a^7$, in which is formed a suitable runway 81 for the balls or spheres that are to be dropped onto the inclined top plate $A^5$, this runway 81 being preferably covered in part by the glass plate 82, and the bottom of the runway 81 terminates in an opening 83, formed in the cross-plate $a^4$ at the top of the inclosing casing. The runway 81 is preferably of zigzag shape to accommodate a large number of balls or spheres, and the top of the runway may be closed by a suitable stoppel 84.

The slide-block R is provided with a cavity $r^2$, that is normally coincident with the bottom portion 83 of the runway 81, so that when the slide-block is in such normal position one of the balls or spheres will drop into the cavity $r^2$ in readiness to be moved forward when the slide-block is shifted. The cavity $r^2$ of the slide-block R is open at its front, and the front plate of the groove or way within which the slide-block is reciprocated is provided with a discharge-opening 85, with which the cavity $r^2$ will be brought coincident when the slide-block is reciprocated in manner to be presently explained, and it is plain that when the cavity $r^2$, with the ball or sphere therein, is brought coincident with the opening 85 the ball or sphere will be discharged onto the inclined top plate $A^5$ and will pass down this plate through the pins 80. At the bottom of the inclined top plate A⁵ are formed the discharge-openings 86, 87, and 88, the central opening 86 being guarded by the raised deflection-ribs 89, as seen in Fig. 2 of the drawings. Beneath the central opening 86 is placed the funnel-shaped mouth $s$ of a delivery-pipe S, this pipe being sustained by a standard 90, that is bolted to the base of the machine. The lower end of the pipe S terminates above an opening $s'$, that is formed in the enlarged upper portion $s^3$ of the upright D, this opening $s'$ being immediately above the seat $e'$ of the supplemental carrier or extension E' when such carrier or extension is in its normal position. The front of the opening $s'$ is cut away, so as to permit the ball to be moved forward by the carrier E' when this carrier is operated by the turning of the operating-shaft.

Figure 1:
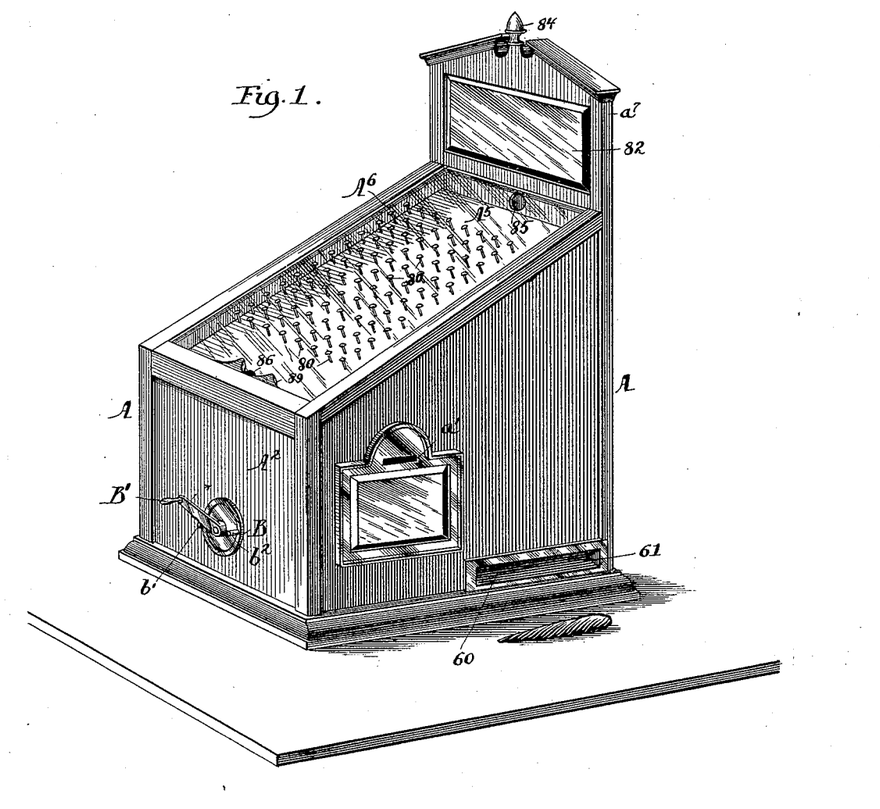
Figure 1 is a perspective view of an apparatus embodying my invention.

From the foregoing description the operation of my improved apparatus will be seen to be as follows: The intending purchaser will place a coin through the slot $a$ in the side of the inclosing casing, and this coin will drop upon the coin-chute F and, if of proper size, will pass down this chute into the channel $e$ of the coin-carrier E. If the coin is not of proper diameter, it will fall through the openings $f$ of the chute F, and if it be not of proper thickness it will, after passing onto the inclined bottom $e^2$ of the channel $e$, roll thence through the slot 2 of the upright or standard D' without effecting the operation of the machine. If, however, the coin be of proper denomination, it will rest within the channel $e$ of the coin-carrier E and will extend slightly above the lower edge of the operating-bar G'. If now the purchaser turn the operating-handle B' in the direction of the arrow, Fig. 1, a partial revolution of the section $c'$ of the operating-shaft and of the coin-carrier will be effected, and as the coin will contact with the operating-arm G' it will cause a movement of this arm and the frame G, thereby producing a partial revolution of the section $c^5$ of the operating-shaft. This partial revolution of the section $c^5$ of the operating-shaft will cause the segment rack-plate M and the rack-plate M' to move forward the discharge-plate M², thereby causing one cigar or other article to be delivered onto the chute or apron 60, whence it will pass through the delivery-opening 61 of the inclosing casing. Hence it will be seen that every time a coin or token of proper denomination or size is placed within the slot of the machine the purchaser can procure a cigar or other article of the value of such coin. As the section $c^5$ of the shaft is revolved in manner last described it will carry with it the rocking arm P, moving this arm to the position seen in dotted lines, Fig. 9, and causing it to turn the shifting rod P' about its pivot-point $p$. This shifting of the rod P' will cause the slide-block R to move laterally until its cavity $r^2$, with a ball or sphere therein, comes coincident with the opening 85 at the top of the inclined plate A⁵ of the casing. The ball will then pass from the cavity $r^2$ of the slide-block and through the opening 85 onto the inclined face of the plate A⁵, and will roll down this plate and between the pins 80 until it passes into one of the openings 86, 87, or 88 at the bottom of the plate A⁵. If the ball should chance to pass through the central opening 86, it will drop into the funnel-shaped mouth $s$ of the pipe S and will pass through this pipe into the seat $e'$ of the supplemental carrier or extension E'. When the ball is thus deposited in the seat $e'$ of the supplemental carrier E', the purchaser can by again turning the operating-handle B' effect a further operation of the machine and cause the discharge therefrom of another cigar or like article, because, as has already been shown, a ball within the seat $e'$ of the supplemental carrier E' will engage with the operating-bar G' and will cause the operation of the discharge mechanism in precisely the same manner as will be effected by means of a coin. Hence it will be seen that, while the purchaser in every instance receives the value of his coin, there is a possibility of his receiving double value in case the ball or sphere that is released in manner above described should fall into the central opening 86 at the bottom of the inclined top A⁵ of the casing. An element of chance is thus introduced, which will tend to increase the sales made by the machine. It is manifest that at each operation of the discharge-plate M² a cigar or other article will be delivered by the machine, and it is plain, also, from the description hereinbefore given that when the ratchet-wheel 46 has made a complete revolution and the cigars or other articles within the compartment-box K immediately above the opening 21 in the table 20 have been exhausted the escapement-lever 40 will be operated, so as to permit the coiled spring 46 to advance the box K until the next succeeding compartment is brought above the opening 21 of the table 20. When all the cigars or other articles have thus been successively discharged from the machine, the box K will be withdrawn to be again filled and replaced.

I wish it understood that the details of construction above set out may be varied within wide limits without departing from the spirit and scope of my invention. So, also, certain features of the invention may be employed without its adoption as an entirety, for, while the invention is directed to an improvement in coin-controlled apparatus for dispensing articles of merchandise, it is obvious that some of its features may be used in connection with coin-controlled apparatus designed for other purposes. So, also, the feature of employing a chance apparatus—such, for example, as a plate having projections upon its surface to deflect a ball or sphere, in connection with a carrier adapted to receive such ball or sphere—may be employed either with or without a coin-controlled apparatus and for the purpose of actuating any apparatus for delivering articles of any desired character, and, indeed, this feature of my invention might obviously be employed as a game apparatus simply, since it is manifest that by placing any suitable articles within the box or receptacle K and permitting the players to deliver the balls or spheres at the top of the plate A⁵ by the manipulation of the carrier-block or slide-block R or otherwise a game of chance might be played, the player receiving the largest number of articles from the compartment K being the successful one. In such case any suitable means might be used for delivering the ball or sphere or other rolling body at the top of the plate A⁵, and when this feature of my invention is employed as a game apparatus simply a hole might be provided at the top of the glass plate A⁶ for the admission of balls or spheres, it being understood, of course, that each player will be provided with a like number of such balls or spheres. Again, it is manifest that instead of forming the compartments of the box K as a single box the series of compartments might be formed separately, being conveniently held together in any suitable way.

Having thus described my invention, what I claim as new, and desire to secure by Letters Patent, is—

1. In apparatus of the class described, the combination, with a coin-controlled mechanism, of a supplemental carrier provided with a seat to receive a ball or sphere, operative connections between said supplemental carrier and said coin-controlled mechanism, suitable means for delivering a ball or sphere to the seat of said supplemental carrier, and a handle for operating said supplemental carrier, whereby when a ball is within the seat of said supplemental carrier the movement of said carrier will serve to actuate the coin-controlled mechanism, substantially as described.

2. In apparatus of the class described, the combination, with suitable coin-controlled mechanism, of a supplemental carrier adapted to receive a rolling body, suitable operative connections between said supplemental carrier and the coin-controlled mechanism, and a plate provided with means for deflecting the rolling body before its passage into said supplemental carrier, substantially as described.

3. In apparatus of the class described, the combination, with suitable coin-controlled mechanism, of a supplemental carrier adapted to receive a rolling body, a handle for shifting said supplemental carrier, suitable operative connections between said supplemental carrier and the coin-controlled mechanism, and a plate provided with pins for deflecting the rolling body before its passage into said supplemental carrier, substantially as described.

4. In apparatus of the class described, the combination, with a coin-carrier, and means for delivering the coin thereto, and suitable operative connections between said carrier and the mechanism to be actuated thereby, of a supplemental carrier adapted to receive a rolling body, and suitable operative connections between said supplemental carrier and the mechanism actuated by the coin-carrier, means for delivering a rolling body to said supplemental carrier, and mechanism for actuating said coin-carrier and said supplemental carrier, substantially as described.

5. In apparatus of the class described, the combination, with a coin-carrier, and means for delivering the coin thereto, and suitable operative connections between said carrier and the mechanism to be actuated thereby, of a supplemental carrier having a seat to receive the rolling body, suitable operative connections between said supplemental carrier and the mechanism to be operated by the coin-carrier, means for delivering a rolling body to the seat of the supplemental carrier, and a suitable handle connected with said coin-carrier and said supplemental carrier for actuating the same, substantially as described.

6. In apparatus of the class described, the combination, with a coin-carrier and means for delivering the coin thereto, of an operating-bar adapted to be engaged by said coin-carrier when a coin is carried thereby, a movable part connected to said operating-bar, a supplemental carrier having a seat to receive a ball or sphere and adapted to actuate said operating-bar, means for delivering a ball or sphere to the said seat of the supplemental carrier, and suitable means for actuating both said coin-carrier and said supplemental carrier, substantially as described.

7. In apparatus of the class described, the combination, with a coin-carrier and means for delivering the coin thereto and suitable operative connections between said coin-carrier and the mechanism to be actuated thereby, of a supplemental ball-carrier, and suitable operative connections between said supplemental carrier and the mechanism actuated by the coin-carrier, means for delivering a ball or sphere to the said supplemental carrier, suitable means for actuating said coin-carrier and said supplemental carrier, and a perforated plate over which the ball will roll, said plate being provided with means for deflecting the ball before its delivery to the supplemental carrier, substantially as described.

8. In apparatus of the class described, the combination of a coin-carrier having a seat adapted to receive a coin, means for delivering a coin to said coin-carrier, a handle connected with said coin-carrier whereby it may be shifted, an operating-bar extending into position to be engaged by a coin within said coin-carrier, a shaft for sustaining said operating-bar separate from the coin-carrier, a segment-rack mounted upon said shaft, a discharge-plate provided with a rack for engagement with said segment-rack, a spring for retracting said segment-rack and said operating-bar and said discharge-plate, a table above said discharge-plate having an opening therein, a box for sustaining the articles to be dispensed, said box being mounted above said table, and a stationary false bottom or plate below said table and serving to support the articles to be dispensed, substantially as described.

9. In apparatus of the class described, the combination of a suitable coin-carrier and means for shifting the same, an operating-bar extending into position to be engaged by a coin within the seat of said coin-carrier, a shaft whereon said operating-bar is sustained separate from said coin-carrier, a segment-rack mounted upon said shaft, a discharge-plate provided with a rack for engagement with said segment-rack, a table beneath which said discharge-plate is sustained, said table being provided with an opening through which the articles to be dispensed may pass one at a time, a false bottom or plate beneath said opening for sustaining the articles to be dispensed, a spring for retracting said shaft and its connected parts, and a suitable discharge chute or apron beneath said false bottom to receive the articles discharged therefrom, substantially as described.

10. In apparatus of the class described, the combination of a carrier for receiving a body whereby the mechanism will be rendered operative and means for operating said carrier, of a discharge device, suitable operative connections between said discharge device and said coin-carrier, a box for sustaining the articles to be dispensed, said box being divided into compartments, and suitable means for shifting said box, substantially as described.

11. In apparatus of the class described, the combination of a carrier for a coin or other body and means for operating the same, of a discharge device, suitable operative connections between said discharge device and said coin-carrier, a box for sustaining the articles to be dispensed, said box being divided into compartments, a shifting frame for advancing said box, and suitable intermittently-actuating mechanism for advancing said box to bring its successive compartments into position to be emptied, substantially as described.

12. In apparatus of the class described, the combination, with a suitable delivery device and mechanism for operating the same, of a box having compartments for containing the articles to be dispensed, a spring for advancing said box, an escapement for controlling the action of said spring, and a pawl and ratchet for operating said escapement mechanism, said pawl and ratchet being operatively connected with said delivery devices, whereby after a certain number of articles have been delivered the escapement will be operated to effect the advance of the compartment-box, substantially as described.

13. In apparatus of the class described, the combination, with suitable delivery mechanism comprising a table having a space therein through which the articles to be delivered may pass, of a false bottom or plate beneath said delivery-space of said table, a series of compartments mounted above said table, a shifting frame connected to said series of compartments, a spring for advancing said shifting frame, and an escapement for controlling the action of said spring, substantially as described.

14. In apparatus of the class described, the combination, with suitable coin-controlled mechanism, of a carrier adapted to receive a rolling body, a plate over which said rolling body may pass, said plate being provided with projections for deflecting said rolling body, and a device connected with the coin-controlled mechanism for delivering said rolling body onto said plate, substantially as described.

15. In apparatus of the class described, the combination, with suitable coin-controlled mechanism, of a carrier adapted to receive a rolling body, a plate over which said rolling body may pass, said plate being provided with projections for deflecting said rolling body, a suitable receptacle for the rolling bodies, a suitable releasing device—such, for example, as a slide-block—for deflecting the rolling bodies successively onto said plate, and suitable connecting mechanism between said slide-block and the coin-controlled mechanism, whereby the operation of the coin-controlled mechanism will serve to release said rolling bodies, substantially as described.

16. In apparatus of the class described, the combination of a coin-carrier, an operating-shaft, and suitable connections whereby said operating-shaft may be united with said coin-carrier, an arm upon said operating-shaft, a shifting rod adapted to be moved by said arm, a discharge device—such, for example, as a slide-block—connected with said shifting rod, a receptacle for rolling bodies, the discharge from which is controlled by said slide-block, an inclined plate provided with projections for deflecting said rolling bodies, a supplemental carrier beneath said inclined plate, and suitable means for conducting the rolling bodies from said inclined plate to said supplemental carrier, substantially as described.

17. In apparatus of the class described, the combination of a coin-carrier having a seat adapted to receive a coin, means for delivering the coin to said coin-carrier, a handle connected with said coin-carrier whereby it may be shifted, a pivoted operating-bar extending into position to be engaged by a coin within said coin-carrier, means for shifting said pivoted bar to release said coin, and a shaft whereon said pivoted operating-bar is mounted, said shaft being movable independently of the coin-carrier and serving to actuate suitable mechanism to be controlled by the coin-carrier, substantially as described.

18. In apparatus of the class described, the combination of a coin-carrier having a seat adapted to receive a coin, means for delivering the coin to said coin-carrier, a handle connected with said coin-carrier whereby it may be shifted, a pivoted operating-bar extending into position to be engaged by a coin within said coin-carrier, a frame for said operating-bar, a shaft to which said frame is connected, said shaft being movable independently of the coin-carrier, a cam-plate with which said operating-bar is engaged, and suitable connections between said shaft and the mechanism to be operated thereby, substantially as described.

19. In apparatus of the class described, the combination of a carrier having a seat to receive a rolling body, means for delivering a rolling body to said carrier, a handle for shifting said carrier, a plate provided with projections for deflecting said rolling bodies, suitable means for delivering the rolling bodies to said carrier, and connections between the said carrier and the mechanism to be operated thereby, substantially as described.

20. In apparatus of the class described, the combination of a carrier having a seat to receive a ball or sphere, a shaft-section whereon said carrier is sustained, a suitable handle for operating said shaft-section, an operating-bar adapted to be engaged by a ball or sphere within said carrier, a shaft-section to which said operating-bar is attached, suitable connections between said shaft-section and the mechanism to be operated thereby, a plate provided with projections for deflecting the rolling body, a suitable conduit for delivering the balls or spheres from said plate to said carrier, and suitable mechanism for delivering the balls or spheres onto said plate, substantially as described.

21. In apparatus of the class described, the combination of a carrier having a seat to receive a ball or sphere, means for delivering the ball or sphere thereto, a handle for shifting said carrier, an inclined plate provided with projections for deflecting the balls or spheres delivered thereto and having its bottom perforated to permit the balls or spheres to pass through said plate, an operating-bar adapted to be engaged by a ball or sphere within said carrier, and suitable connections between said operating-bar and the mechanism to be actuated thereby, substantially as described.

ROBERT H. LITTLE.

Witnesses:
JAMES H. PIERCE,
T. B. CARPENTER.